United States Patent Office 3,848,008
Patented Nov. 12, 1974

3,848,008
DILITHIUM INITIATORS FROM CERTAIN CONJUGATED DIENES YIELDING DELOCALIZED CHAIN ENDS
Lewis J. Fetters, Akron, Ohio, assignor to First National City Bank, New York, N.Y.
No Drawing. Filed Nov. 26, 1971, Ser. No. 202,662
Int. Cl. C07f 1/02
U.S. Cl. 260—665 R                          6 Claims

ABSTRACT OF THE DISCLOSURE

Preparation of dilithium initiators from conjugated dienes, yielding delocalized chain ends, by reacting certain types of conjugated dienes, notably hexadienes or octadienes, in advantageously a polar/nonpolar solvent medium, with an alkali metal, particularly lithium. The said initiators are highly useful for the polymerization of conjugated dienes.

---

My invention relates to the preparation of novel dilithium initiators derived from certain conjugated dienes yielding delocalized chain ends.

I have discovered that conjugated diene monomers of the type described below, when reacted with an alkali metal, notably lithium, in a polar or nonpolar solvent medium, are converted into di-carbanion compounds which are characterized by certain properties rendering them highly useful as difunctional initiators for the polymerization of conjugated dienes. The conjugated diene monomers which are reacted with the alkali metal, in the manner generally referred to above, are those which possess internal double bonds, that is, those which are not attached to terminal carbon atoms substituted only by hydrogen atoms. At least most of said starting conjugated dienes of this type correspond to the formula

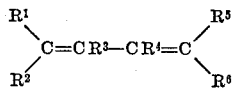

where $R^1$ and $R^2$, $R^5$ and $R^6$ are hydrogen, or $C_1$–$C_8$ alkyl, or cycloalkyl or aralkyl each containing not more than 8 carbon atoms, with the proviso that both $R^1$ and $R^2$, on the one hand, and that both $R^5$ and $R^6$, on the other hand, cannot be hydrogen; and $R^3$ and $R^4$ are each hydrogen or $C_1$ to $C_8$ alkyl or cycloalkyl containing not more than 8 carbon atoms. Thus, by way of illustration, $R^1$, $R^2$, $R^5$ and $R^6$ may be any of methyl, ethyl, n-propyl, isopropyl, n-butyl, isobutyl, tert-butyl, n-amyl, isoamyl, n-hexyl, isohexyl, n-pentyl, isopentyl, n-octyl, isooctyl, cyclopropyl, cyclopentyl, cyclohexyl, cyclooctyl, or benzyl; and $R^3$ and $R^4$ may be any of the foregoing alkyl or cycloalkyl radicals. Of particular usefulness are those conjugated dienes in which at least one of the $R^1$ and $R^2$ is methyl, and the same situation applied to $R^5$ and $R^6$, and in which each of $R^3$ and $R^4$ is hydrogen.

Illustrative examples of said starting conjugated dienes for the production of the initiators, among the open chain group, are 2,4-hexadiene (cis-cis, cis-trans, and trans-trans or mixtures of two or more thereof); 2-methyl-2,4-hexadiene; 2-cyclohexyl-2,4-hexadiene; 2,5-dimethyl-2,4-hexadiene; 2,3,4-tetramethyl-2,4-hexadiene; 2-benzyl - 2,4-hexadiene; 2,4-octadiene; 3,5-octadiene; 3,6-dimethyl-2-hexyl - 2,4 - hexadiene; 2-isopropyl-2,4-hexadiene; 2-isobutyl-2,4-hexadiene; 2-isoamyl-2,4-hexadiene; 2,5-diethyl-2,4 - hexadiene; 2,5 - diisopropyl-2,4-hexadiene; 2,3,4,5-tetraethyl-2,4-hexadiene; 2,3,4,5 - tetrapropyl - 2,4-hexadiene; 3,6-diethyl-3,5-octadiene; 3,6-diisopropyl-3,5-octadiene. Illustrative examples of starting closed chain or cyclic conjugated dienes are 1,3-cycloheptadiene; 1,3-cyclooctadiene; 1,3-cyclodecadiene; 1,3 - cyclodecadiene–1,4-dimethyl-1,3-cyclooctadiene; 1,4-diethyl-1,3 - cyclooctadiene; and 1,4-diisopropyl-1,3-cyclooctadiene.

When the foregoing class of diene monomers is reacted with an alkali metal, such as lithium, in the aforementioned reaction environment, a delocalized structure is generated in which said alkali metal is the counter-ion. The foregoing reaction results in the generation of an ion-radical species which couples to yield the di-carbanion initiators of the present invention. The said initiators have well defined functionality and structure; they do not react rapidly with the conjugated diene monomer from which they are prepared, that is, they exhibit a low tendency to homopolymerization; and they have been found to be rapid initiators of butadiene, isoprene and styrene polymerizations in hydrocarbon solvents. Dilithium initiators of the types heretofore known to the art generally require the presence of strongly solvating ethers or tertiary amines to render them adequately soluble in hydrocarbon solvents. In sharp contrast, the novel dilithium initiators of my invention exhibit a distinctly low extent of chain-end association in hydrocarbon solvents, thus leading to improved hydrocarbon solvent solubility with relatively low viscosities.

In the initiators of my present invention, the organoalkali metal, illustratively the organolithium, chain ends resulting from, for example, 2,4-hexadiene, must, under all circumstances, have at least a secondary carbanion at the chain-end, the secondary carbon-lithium bond generally being positioned alpha to a double bond. This is in sharp contrast to the situations where the conjugated diene is, for instance, butadiene or isoprene or pentadiene in which cases the structures of their chain-ends involve a primary carbanion. The unexpected delocalized nature of the secondary carbon-lithium bonds in the initiators of my invention, which appears to account for their particular valuable properties, has been demonstrated by proton magnetic resonance spectroscopy.

As pointed out above, a valuable property of the initiators of my present invention, and due to the delocalized nature of their carbon-lithium bonds, is low extent of chain-end association. Although chain-end association is not a disadvantage of monolithium organics such as allyllithium, sec-butyllithium or polyisophenyllithium, it is a decided disadvantage in dilithioorganics, especially when dissolved in hydrocarbon solvents where association levels are generally the highest. During the early stages of polymerizations initiated by dilithioorganics, a point is reached when precipitation of the growing chains occurs and the heterogeneity of the ensuing system causes a broadening of the molecular weight distribution of the resulting polymer as growth continues. Sometimes, further growth of the polymer does not occur at all. The dilithio adducts of internal conjugated dienes, on the other hand, to wit, the initiators of my invention, even in purely hydrocarbon solvents, have a much lower degree of association (DA=1.3) than the dilithio adducts of external conjugated dienes such as isoprene (DE=2.0) and precipitation of growing chains during polymerization does not occur. Smooth, unterminated polymerizations are initiated with the aid of my novel dilithio initiators and the resulting polymers possess a very narrow molecular weight distribution.

The novel compounds of this invention can be depicted as shown below:

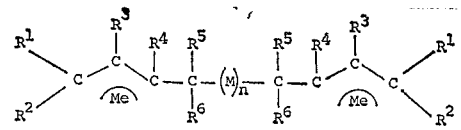

Where $R^1$, $R^2$, $R^3$, $R^4$, $R^5$ and $R^6$ are alkyl or hydrogen groupings as described above for the conjugated dienes, Me is an alkali metal, M is a monomer unit having at least one of the following structures:

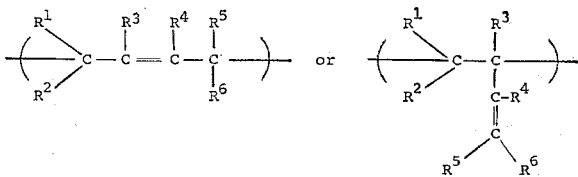

and $n$ may be zero or an integer from 1 to 10, but preferably from 1 to 5.

A typical example of a compound having the above structure is the dilithio adduct of 2,4-hexadiene (tetramer) which may be illustrated as follows:

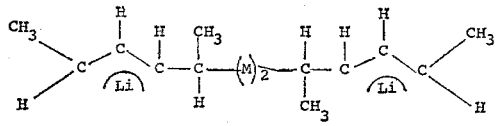

Again, illustratively, the following formula depicts the structure for the dilithio adduct (tetramer) of 2,5-dimethyl-2,4-hexadiene:

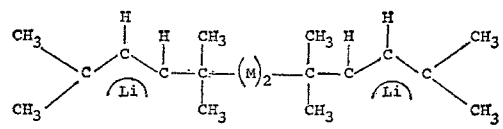

Illustrative of a cyclic structure of the initiators of my invention is the dilithio adduct (dimer) of 1,3-cyclooctadiene:

or

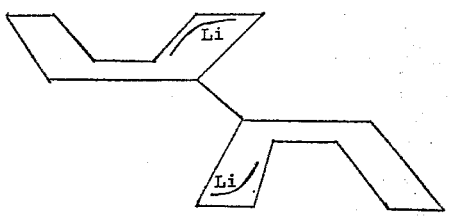

In the preparation of the initiators of my invention, the reaction between the internal conjugated diene and the alkali metal is carried out in a solvent system which can be either a purely polar solvent such as diethyl ether or dimethyl ether, trimethylamine, triethylamine, tetrahydrofuran, dioxane, N,N,N',N' - tetramethylethylenediamine, and methyltriethylenediamine, or mixtures thereof; or purely hydrocarbon systems such as $n$-hexane, $n$-heptane, cyclohexane, benzene, toluene, tetralin and cyclooctane, or mixtures thereof; or mixtures of polar and non-polar solvents as described above. Generally, reactions in the polar/non-polar solvent combinations are carried out at temperatures close to ambient, that is, around 0° to 50° C., and these mixed solvent systems are preferred because reactions proceed sufficiently rapidly in them and yet side reactions, such as cleavage of the polar solvent, are minimized.

Various alkali metals can be used but, as a practical proposition, lithium, sodium and potassium, especially lithium, or lithium containing small proportions of sodium, for instance 0.2 to 1%, is employed. The alkali metal can be used in a variety of forms such as coarse particles or sand, fine particles or dispersions, finely drawn wire or ribbon, or even larger pieces such as slices or pieces of the metal.

The following examples are illustrative of the preparation of the initiators and their use in polymerization reactions, all in accordance with the present invention. It will be understood that other initiators can be made and other polymerizations carried out in the light of the guiding principles and teachings disclosed herein. All temperatures are in degrees C.

EXAMPLE 1

A. Materials and Reaction Conditions 8 g. 2,4-hexadiene (cis-cis)
50 cm.³ benzene
6 cm.³ triethylamine
1 g. lithium metal (as a 30% by weight dispersion in petrolatum)
Reaction time—18 hrs. at 20°

B. Procedure

The lithium dispersion is placed in a reaction vessel, the benzene and the triethylamine are then added, with stirring, and then the 2,4-hexadiene is added either all at once or, preferably, gradually while stirring. The color of the clear final product solution after filtration is a deep reddish-brown and the concentration of initiator is 0.75 ML$^{-1}$ (carbon-lithium).[1]

EXAMPLE 2

A. Materials and Reaction Conditions 5 g. 2,4-hexadiene (cis-cis)
50 cm.³ dimethylaniline
1 g. lithium metal (as a 30% by weight dispersion in petrolatum)
Reaction time—18 hrs. at 20°

B. Procedure

The procedure described in part B of Example 1 is followed. The color of the clear final product solution is a deep reddish brown and the concentration of initiator is 0.48 ML$^{-1}$ (carbon-lithium).[1]

EXAMPLE 3

A. Materials and Reaction Conditions 8 g. 2,5-dimethyl-2,5-hexadiene
30 cm.³ benzene
10 cm.³ triethylamine
1 g. lithium metal (as a 30% by weight dispersion in petrolatum)
Reaction time—18 hrs. at 20°

B. Procedure

The procedure described in part B of Example 1 is followed. The color of the clear final product solution is a deep reddish-brown and the concentration of initiator is 0.45 ML$^{-1}$ (carbon-lithium).[1]

EXAMPLE 4

A. Materials and Reaction Conditions 8.8 g. 1,3-cyclooctadiene
60 cc. benzene
15 cc. triethylamine
1.2 g. lithium metal (as dispersion as in Example 1)
Let stir for 1.5 days.

B. Procedure

The procedure described in part B of Example 1 is followed. The color of the clear final product solution is a cherry-red and the concentration of initiator is 1.14 ML$^{-1}$ (carbon-lithium).[1]

[1] Milliequivalents per milliliter of solution.

EXAMPLE 5

A. Materials and Reaction Conditions 8 g. 2,4-hexadiene (*cis-cis*)
50 cm.³ benzene
6 cm.³ triethylamine
3.5 g. sodium metal (as a 30% by weight dispersion in petrolatum)
Reaction time—20 hrs. at 25°

B. Procedure

The procedure described in part B of Example 1 is followed. The color of the clear final product solution is a reddish-brown and the concentration of initiator is 0.6 ML$^{-1}$ (carbon-sodium).[1]

EXAMPLE 6

A. Materials and Reaction Conditions 8 g. 2,5-dimethyl-2,5-hexadiene
50 cm.³ benzene
10 cm.³ triethylamine
5.6 g. potassium metal (as a 25% by weight dispersion in petrolatum)
Reaction time—20 hrs. at 25°

B. Procedure

The procedure described in part B of Example 1 is followed. The color of the clear final product solution is a reddish-brown and the concentration of initiator is 0.5 ML$^{-1}$ (carbon-potassium).[1]

There is nothing critical about the relative amounts of the internal conjugated diene, the alkali metal and the organic solvent medium used in the reaction to produce the initiators. In general, for each gram mol of internal conjugated diene, from 0.5 to 4, better still from 0.5 to 2 and particularly about 0.75 to 1.25 gram atoms of alkali metal is employed. The amount of the organic solvent medium is generally sufficient preferably to result in the production of a relatively strong solution of the initiator, but the amount of the organic solvent can be varied considerably to result in solutions of the initiator of widely varying concentrations.

It will be clear, in view of the foregoing, that the initiators of my invention can be prepared in relatively high concentrations and remain soluble, for instance, in benzenetriethylamine mixed solvents and in dimethylaniline. As indicated above, they are highly effective in the polymerization of conjugated dienes notably those containing external double bonds to yield homopolymers, as well as heteropolymers or copolymers, with or without a high 1,4 content, as the case may be. Such conjugated dienes, notably 1,3-conjugated dienes which, in their monomeric form, contain from 4 to 12 carbon atoms per molecule, which can be polymerized utilizing the initiators of my invention include, by way of illustration, 1,3-butadiene; isoprene; 2,3-dimethyl-1,3-butadiene; 1,3-pentadiene (piperylene); 2-methyl-3-ethyl-1,3-butadiene; 3-methyl-1,3-pentadiene; 1,3-hexadiene; and 2-methyl-1,3-hexadiene. Among the dialkylbutadienes, it is preferred that the alkyl groups contain from 1 to 3 carbon atoms. Numerous others are disclosed, for instance, in U.S. Pat. No. 3,377,404, the disclosure with respect to which is incorporated herein by reference.

In addition to or in place of the above described conjugated dienes, polymers of polymerizable vinyl-substituted aromatic compounds can be made utilizing the initiators of my invention. These include styrene; alpha-methylstyrene; 1-vinylnaphthalene; 2-vinylnaphthalene; 1-alphamethylvinylnaphthalene; 2-alpha-methylvinylnaphthalene; 1,2-diphenyl-4-methylhexene-1; 1,6 - diphenylhexadiene-1,5; 1,3-divinylbenzene; 1,3,5-trivinylbenzene; 1,3,5-triisopropenyl-benzene; 1,4-divinylbenzene; 1,3 - distyrylbenzene; 1,4-distyrylbenzene; 1,2-distyrylbenzene; and mixtures of these, as well as alkyl, cycloalkyl, aryl, alkaryl and aralkyl derivatives thereof in which the total number of carbon atoms in the combined hydrocarbon constituents is generally not greater than 12. Examples of these latter compounds include: 3-methylstyrene; 3,5-diethylstyrene; 2-ethyl-4-benzylstyrene; 4-phenylstyrene; 4-p-tolylstyrene; 2,4-divinyltoluene; 4,5-dimethyl-1-vinylnaphthalene; 2,4,6-trivinyltoluene; and 2,4,6-triisopropenyltoluene. Again, reference is made to U.S. Pat. No. 3,377,404 for disclosures of additional vinyl-substituted aromatic compounds which are incorporated herein by reference.

GPC traces of an illustrative polyisoprene made with the initiator of Example 1 showed a narrow molecular weight distribution. No solubility problems were encountered during the polymerization. Furthermore, the predicted number-average molecular weight (75,000) was in good agreement with the measured value (74,000). Difunctionality of the initiator of Example 1 was shown by polymerizing 1,3-butadiene to a molecular weight of 5,000 and reacting the chain ends with ethylene oxide. Hydroxyl functionality of the resulting polymer was found to be 2.0.

The following Examples show the preparation of OH-capped polybutadienes utilizing the initiators of Examples 1 and 4.

EXAMPLE 7

Preparation of OH-Capped Polybutadiene 25 g. isoprene
250 cm.³ benzene
10 mmoles initiator (as carbon-lithium) of Example 1
$\overline{M}_s = 5{,}000$ (Predicted Number Average Molecular Weight)
$\overline{M}_n = 5{,}200$ (Actual Number Average Molecular Weight)
Functionality=2.03 (Theoretical=2.00)

EXAMPLE 8

Preparation of OH-Capped Polybutadiene 31 g. iosprene
275 cm.³ benzene
16.4 mmoles initiator (as carbon-lithium) of Example 4
$\overline{M}_s = 3{,}700$ (Predicted Number Average Molecular Weight)
$\overline{M}_n = 3{,}800$ (Actual Number Average Molecular Weight)
Functionality=1.94 (Theoretical=2.00)

In the polymerizations of both Examples 7 and 8, the initiator is added to the monomer-solvent mixture at 20°. No precipitate appears. After 4 hrs. ethylene oxide is added whereupon the solutions gel. The —OLi chain-ends are converted to —OH groups via the addition of a stoichiometric amount of HCl.

I claim:

1. A dialkali metal adduct (dimer) of 1,3-cyclooctadiene having the formula

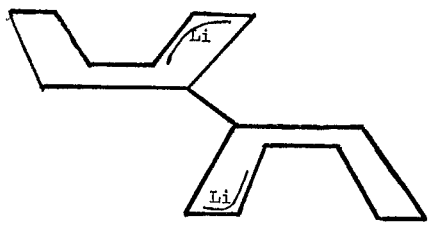

2. In a method of preparing dialkali metal-diene adducts having utility as initiators for the polymerization of conjugated dienes, the steps which comprises reacting an internally double-bonded conjugated diene with an alkali metal in the presence of an organic solvent system selected from the group consisting of (a) trimethylamine, triethylamine, N,N,N',N'-tetramethylethylenediamine and methyltriethylenediamine and mixtures thereof, and (b) mixtures of the aforesaid (a) materials with hydrocarbon solvents.

---
[1] Millequivalents per milliliter of solution.

3. The method of claim 2 in which said internally double-bonded conjugated diene corresponds to the formula

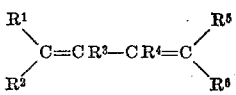

where $R^1$, $R^2$, $R^5$ and $R^6$ are hydrogen, of $C_1$-$C_8$ alkyl, or cycloalkyl or aralkyl each containing not more than 8 carbon atoms, with the proviso that both $R^1$ and $R^2$, on the one hand, and that both $R^5$ and $R^6$, on the other hand, cannot be hydrogen; and $R^3$ and $R^4$ are each hydrogen or $C_1$-$C_8$ alkyl or cycloalkyl containing not more than 8 carbon atoms.

4. The method of claim 3 in which the alkali metal is lithium.

5. The method of claim 4 in which $R^1$ and $R^5$ are methyl, $R^2$ and $R^6$ are selected from the group consisting of hydrogen and methyl, and $R^3$ and $R^4$ are selected from the group consisting of hydrogen and methyl.

6. The method of claim 2 in which the reaction is carried out at a temperature in the range of about 0 to 50° C.

References Cited

UNITED STATES PATENTS

| 3,308,110 | 3/1967 | Pritchett | 252—431 L |
| 3,392,202 | 7/1968 | Pritchett | 260—665 R |
| 3,452,112 | 6/1969 | Kamienski et al. | 260—665 R |
| 3,679,776 | 7/1972 | Foss | 260—942 M |

PATRICK P. GARVIN, Primary Examiner

A. P. DEMERS, Assistant Examiner

U.S. Cl. X.R.

252—431 L; 260—83.7, 93.5 R, 94.2 M